（12) United States Patent
Lattimer et al.

(10) Patent No.: US 6,622,848 B1
(45) Date of Patent: Sep. 23, 2003

(54) POUCH REVERSE SHINGLING SYSTEM

(75) Inventors: Jason Lattimer, Alexandria, MN (US); Irvan Pazdernik, Alexandria, MN (US); Paul Wagner, Alexandria, MN (US)

(73) Assignee: Douglas Machine, Alexandria, MN (US)

( * ) Notice: Subject to any disclaimer, the term of this patent is extended or adjusted under 35 U.S.C. 154(b) by 0 days.

(21) Appl. No.: 10/207,931

(22) Filed: Jul. 29, 2002

(51) Int. Cl.⁷ .............................................. B65G 47/26
(52) U.S. Cl. .................................. 198/418.9; 198/419.2
(58) Field of Search ........................... 198/418.8, 418.9, 198/414.2, 418.5, 424, 430, 406; 271/182, 183, 184

(56) References Cited

U.S. PATENT DOCUMENTS

| 4,018,326 | A | * | 4/1977 | Hardy ................. | 198/419.2 X |
| 4,214,743 | A | * | 7/1980 | Meier ................. | 198/418.9 X |
| 4,238,024 | A | * | 12/1980 | Hirakawa et al. ........ | 198/418.9 |
| 5,097,939 | A | * | 3/1992 | Shanklin et al. ......... | 198/419.2 |
| 5,238,120 | A | * | 8/1993 | Ballestrazzi et al. . | 198/418.9 X |
| 5,358,093 | A | * | 10/1994 | Gigante et al. ...... | 198/418.9 X |
| 5,669,754 | A | * | 9/1997 | Croteau et al. ...... | 198/418.5 X |
| 5,873,448 | A | * | 2/1999 | Tsai et al. ............ | 198/418.9 X |

OTHER PUBLICATIONS

Illustrations of Awrey Bakeries, Inc., Infeed Assembly, Drawing No. M2394–007R, dated Nov. 23, 1992.

* cited by examiner

Primary Examiner—James R. Bidwell
(74) Attorney, Agent, or Firm—Nelson R. Capes; Briggs and Morgan (57) ABSTRACT

Apparatus for collating products into arrays, comprising:

(a) an upper conveyor receiving the products at random intervals, the upper conveyor moving in a first direction, the upper conveyor establishing a first gap thereon between each product and a second gap thereon to create groups of products, the upper conveyor having a nose;

(b) a lower conveyor positioned below the upper conveyor and receiving the products from the upper conveyor, the lower conveyor moving in a second direction substantially opposed to the first direction; and (c) a reverse shingling plate associated with the upper conveyor at the nose thereof and blocking product movement beyond the nose, whereby product encountering the reverse shingling plate drops onto the lower conveyor.

13 Claims, 10 Drawing Sheets

POUCH REVERSE SHINGLING SYSTEM

BACKGROUND OF THE INVENTION

The present invention generally relates to an apparatus for positioning bagged products on a conveyor, and in particular, to a conveyor apparatus for collating bagged products and thereby aiding in the transfer of the bagged products into shipping containers.

In order to expedite the packing of individually bagged products, such as potato chips, into shipping containers, it is desirable to have the bagged products in a vertically oriented array. The vertical orienting of bagged products, known in the art as collating, allows for efficient transition of the bagged product into shipping containers.

Formerly, the process of gathering the bagged products from conveyors and transferring them into shipping containers was a tedious and time-consuming task. The bagged products were randomly spaced and horizontally positioned on the conveyor, making it difficult to transfer the individually bagged products from the conveyor into shipping containers.

U.S. Pat. No. 4,356,906 issued Nov. 2, 1982 to David M. Fallas, herein incorporated by reference, discloses a device that eliminates the difficult task of manually gathering and arranging the product bags on the conveyor for transfer into the shipping containers. However, the device was expensive and complicated. More particularly, in this device, the bags will normally be received one after the other in horizontal disposition with the bottom of each bag leading the way. Each bag will then be pivoted around its bottom and deposited on a belt which moves stepwise. The first bag in each linear array will lie on the belt with the top of the bag facing downstream toward an end plate or ramp which is inclined away from the top of the bag. With each successive step of the belt, another bag will be deposited on the belt such that it will rest on the next preceding bag in a leaning position. When a complete array has been so deposited, the belt will then advance the entire array against the end plate or ramp such that all of the bags in the array are either inclined or vertical, but preferably inclined. This array is then pushed or otherwise moved on to a trap door of a loading station where it is preferably kept in its linear array form. This sequence of events is repeated until enough arrays are present at the loading station to supply all of the rows needed in a shipping box or similar container. If the arrays are still inclined at this point, they are first pushed into a vertical position and then deposited in the container.

U.S. Pat. No. 5,495,932 issued Mar. 5, 1996 to William B. Dyess improves on the Fallas patent. However, this device is also unnecessarily expensive and complicated and takes up too much floor space.

The problems that the present application addresses that were not solved by earlier devices are: 1) minimizing the floor space needed by the conveyor system; 2) adjusting the spacing of incoming product so that the conveyors may run continuously, rather than in a stepwise fashion, thus increasing performance; and 3) keeping the product bags flat as long as possible, to avoid product settling. Other objects and advantages of the present invention will be made clear to one of ordinary skill in the art upon reading the remainder of the application.

SUMMARY OF THE INVENTION

Apparatus for collating products into arrays, comprising:
(a) an upper conveyor receiving the products at random intervals, the upper conveyor moving in a first direction, the upper conveyor establishing a first gap thereon between each product and a second gap thereon to create groups of products, the upper conveyor having a nose;
(b) a lower conveyor positioned below the upper conveyor and receiving the products from the upper conveyor, the lower conveyor moving in a second direction substantially opposed to the first direction; and
(c) a reverse shingling plate associated with the upper conveyor at the nose thereof and blocking product movement beyond the nose, whereby product encountering the reverse shingling plate drops onto the lower conveyor.

The Pouch Reverse Shingling system collates and separates product for delivery to other equipment. This method of handling product permits higher production rates with reduced product settling and damage.

The system consists of the following components. For convenience, one instance of each component is described, however, multiple instances of components are within the scope of this patent.

Upper Conveyor:

The Upper Conveyor's main purpose is to assist in controlling the gap between consecutive pouches. The Upper Conveyor creates these gaps by changing its discharge position and the product speed. The belt speed is based on the pouch feed rate from the Random Infeed Conveyor. The discharge position varies within a designed window based on where a pouch should be placed on the Reverse Conveyor.

There are two different gaps that are generated on the Upper Conveyor. The first gap is created from the Upper Conveyor running relatively faster than the Random Infeed Conveyor. This gap allows the pouches to be registered and provide the time needed to position the Reverse Conveyor in the proper position to receive the next pouch. The second gap provides the necessary time for the cross-pusher to remove a completed row off the Reverse Shingling Conveyor before the next pouch enters the cross-pusher area. Increasing the Upper Conveyor length between the last bag in a row and the next row's first bag creates the second gap. The next step in the collating process is the Reverse Shingling Plate.

Applicant has used the Upper Conveyor in other apparatus in the past, but Applicant believes that such use does not bar patentability of the present invention.

Upper Conveyor Sensor:

The Upper Conveyor Sensor registers and establishes a tracking start point for product on the Upper Conveyor. This sensor is also used to count the number of products delivered to the Lower Conveyor.

Reverse Shingling Plate:

The Reverse Shingling Plate provides a deflection point for the product to transfer from the Upper Conveyor to the Lower Conveyor. The program that allows the Reverse Shingling Plate to change position is designed to provide a consistent transfer for each pouch. This removes the uncertainty that a pouch will not be positioned correctly on the Lower Conveyor based on the transfer from the Upper Conveyor to the Lower Conveyor.

Lower Conveyor:

The Lower Conveyor completes the inline collating process by shingling product into a group that is transferred by the Cross Pusher Plate to the Loader Deck. The Lower Conveyor creates a product group by reversing individual product's direction of travel and allowing consecutive products to overlap.

Cross Pusher Plate:

The Cross Pusher Plate transfers the product groups off the Lower Conveyor and on to the Loader Deck. The Cross Pusher Plate pivots up to pass over product when returning.

Loader Deck:

The Loader Deck accumulates the rows of product.

Divider Plate:

A slot in the Loader Deck allowing a divider to be inserted between rows of product.

Loader Plate:

The Loader Plate transfers the product groups from the Loader Deck to the machine's discharge station.

Operation Summary:

Product is transported horizontally on the Random Infeed Conveyor (not shown) to the Upper Conveyor. Product may be spaced irregularly, however, a minimum gap between products must be maintained. The Upper Conveyor may run at a higher rate than the Random Infeed Conveyor to increase the gap between products.

Product is transferred to the Upper Conveyor. A sensor registers the product position on the Upper Conveyor. The position of the product is tracked relative to conveyor travel.

The product is then deflected by the Reverse Shingling Plate and transferred to the Lower Conveyor. Its direction of travel will be reversed and it will overlap onto product waiting on the Lower Conveyor. Operation continues in this manner until the desired number of products is accumulated on the Lower Conveyor. Products are counted using the Upper Conveyor Sensor.

Two actions happen once a group of products is complete. The Upper Conveyor returns to its start position by increasing its length and the Cross Pusher Plate transfers the product group from the Lower Conveyor to the Loader Deck. After the row is fully on the Loader Deck the Cross-Pusher Plate pivots up, clearing the height of the product and returns to its start position.

Rows of product are accumulated on the loader deck. Once the desired number of rows is accumulated, the Loader Plate pushes them into the machine's discharge station.

A principal object and advantage of the present invention is that it minimizes the floor space needed by the conveyor system by having the Lower Conveyor under and running in a direction opposite to that of the Upper Conveyor.

Another object and advantage of the present invention is that it reverses the orientation of the product so that the product will be put into containers bottom first, without the need for a mechanism that grips and rotates the product.

Another object and advantage of the present invention is that it adjusts the spacing of incoming products so that the conveyors can run continuously, rather than in a stepwise fashion, thus increasing performance.

Another object and advantage of the present invention is that it keeps the products flat as long as possible before being put into containers, thereby avoiding product settling within its containers.

DETAILED DESCRIPTION OF THE PREFERRED EMBODIMENT

One embodiment of the apparatus 10 of the present invention is shown in the Figures.

The apparatus 10 comprises an Upper Conveyor 20, a Lower Conveyor 30 running in a direction opposite that of the Upper Conveyor 20, a Reverse Shingling Plate 40 transferring product P between the Upper Conveyor 20 and the Lower Conveyor 30, a Loader Deck 50, a Cross Pusher 60 moving product P between the Lower Conveyor 30 and the Loader Deck 50, and a Loader Plate 70 moving product P between the Loader Deck 50 and a discharge station 80.

Figure 4:
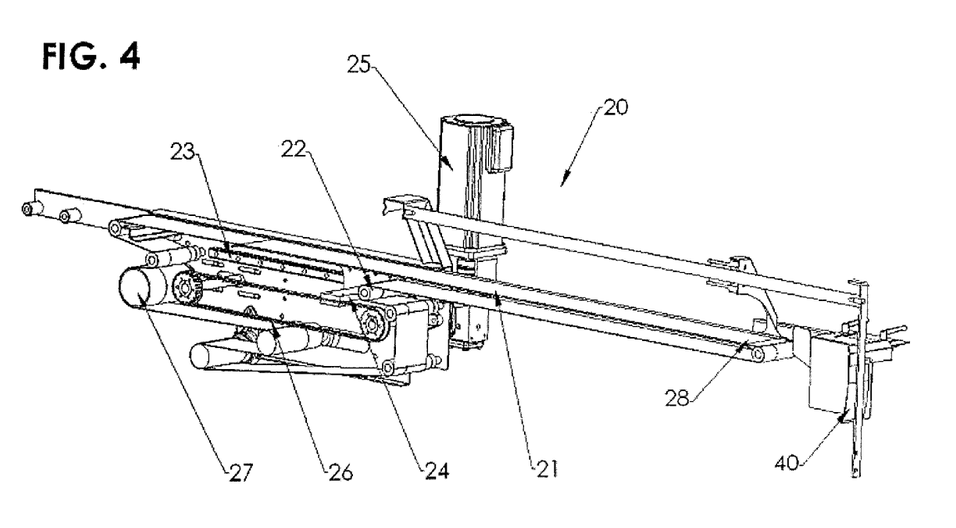
FIG. 4 is a schematic of the upper conveyor of the present invention in its extended position.
Figure 5:
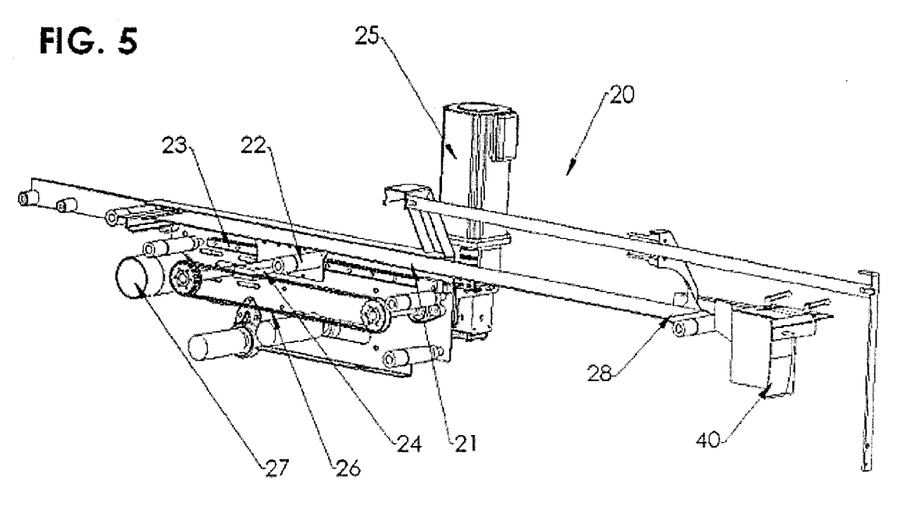
FIG. 5 is a schematic of the upper conveyor of the present invention in its retracted position.

The Upper Conveyor 20 is shown in more detail in FIGS. 4 and 5. The Upper Conveyor 20 further comprises a tabletop belt 21, a linear rail 23 attached to the tabletop belt 21, a tabletop belt pulley 22 attached to the linear rail 23, an attachment plate 24 connected to the linear rail 23, a drive 25, a length adjustment belt 26 connected to the drive and to the attachment plate 24, and a tabletop belt drive pulley 27 over which the tabletop belt 21 passes and by which it is driven. The Upper Conveyor 20 has a nose 28. Product will drop off the Upper Conveyor 20 at the nose 28 when the product hits the Reverse Shingling Plate 40 and fall onto the Lower Conveyor 30.

As seen in FIGS. 4 and 5, the Upper Conveyor 20 can change its length. FIG. 4 shows the Upper Conveyor in a fully extended position while FIG. 5 shows the Upper Conveyor 20 in a fully retracted position. It will be understood that the length of the Conveyor 20, that is, the length of the tabletop belt 21 to the left of the nose 28, may vary incrementally between that of the fully extended position and the fully retracted position.

The length of the Upper Conveyor 20 is changed as follows. Starting in the fully extended position (FIG. 4), the drive 25 is activated, causing the length adjustment belt 26 to rotate counterclockwise. This rotation in turn causes the attachment plate 24 to pull the linear rail 23 to the left, causing the tabletop belt pulley 22 to also move to the left. The result, shown in FIG. 5, will be that the tabletop belt 21 will also be moved to the left, moving the nose 28 to the left and thus decreasing the length of the tabletop belt 21 to the left of the nose.

Operation of the apparatus will now be described.

The Upper Conveyor 20 receives product P from a source such as a random in-feed conveyor (not shown). Product may be irregularly spaced as it is received by the Upper Conveyor 20. Product is received on the Upper Conveyor bottom-forward.

As each product is received on the Upper Conveyor 20, it is detected by some mechanism, for example, a photoelectric eye 78.

The Upper Conveyor runs at an appropriate speed faster than that of the random infeed converyor so that an appropriate gap will occur between each product. The gap is of such a dimension as to allow the Lower Conveyor 30 to position itself to receive the next product, as will be described below.

The Reverse Shingling Plate 40 provides a deflection point for the product to transfer from the Upper Conveyor 20 to the Lower Conveyor 30. That is, product hits the Reverse Shingling Plate 40 and falls onto the Lower Conveyor 30. As this occurs, the product's direction of travel changes so that it moves on the Lower Conveyor with the product top forward.

The Lower Conveyor 30 runs in a direction opposite to that of the Upper Conveyor 20. As each product falls onto the Lower Conveyor 30, the Lower Conveyor 30 moves the product in the direction of movement of the Lower Conveyor 30.

Figure 6A:
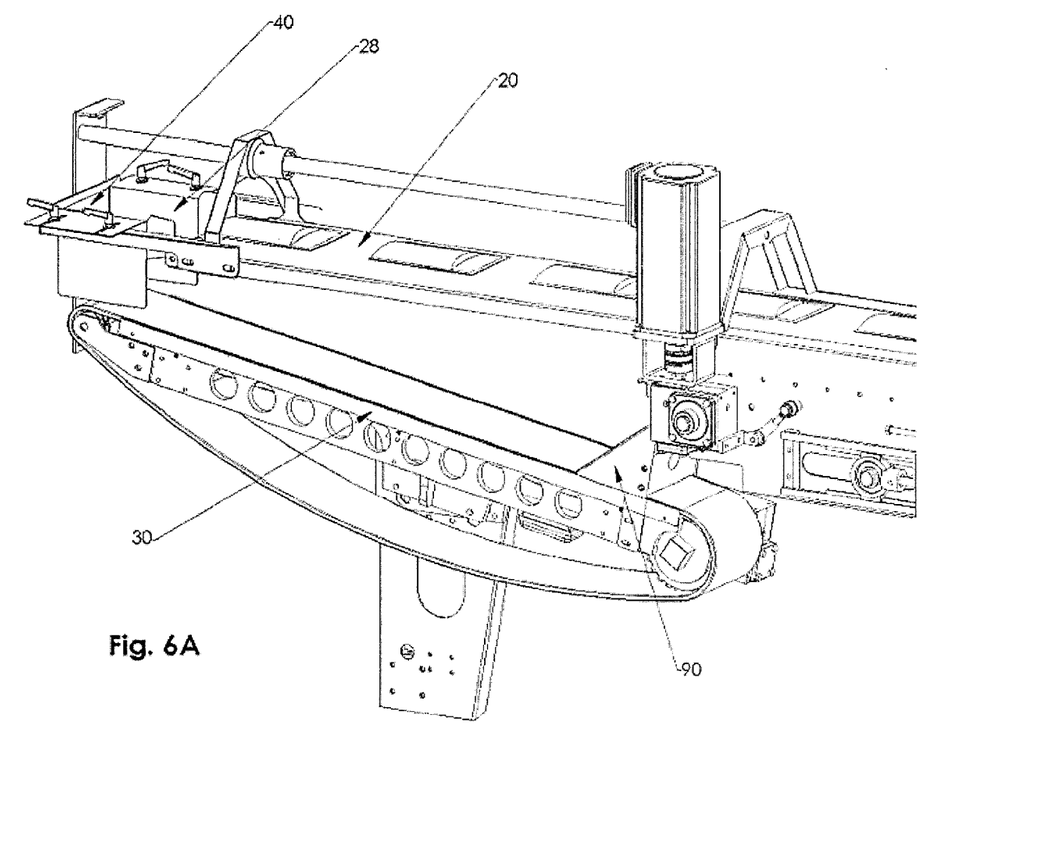
FIGS. 6A–6E are schematics of the upper and lower conveyors of the present invention, showing a sequence of steps in the movement of product from the upper conveyor to the lower conveyor.
Figure 6B:
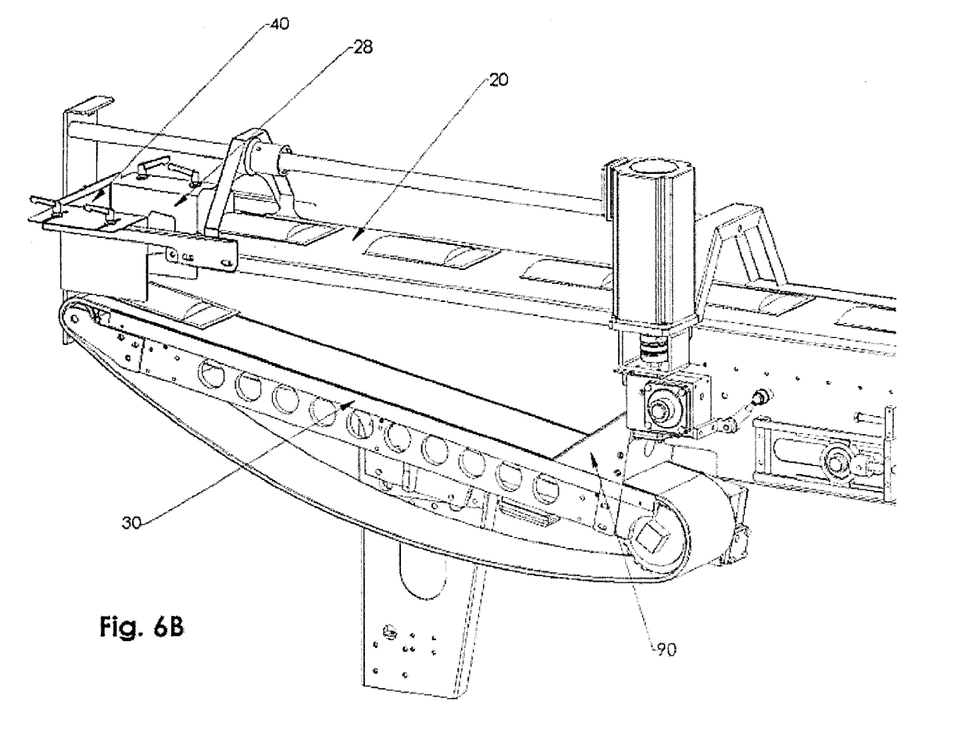
Figure 6C:
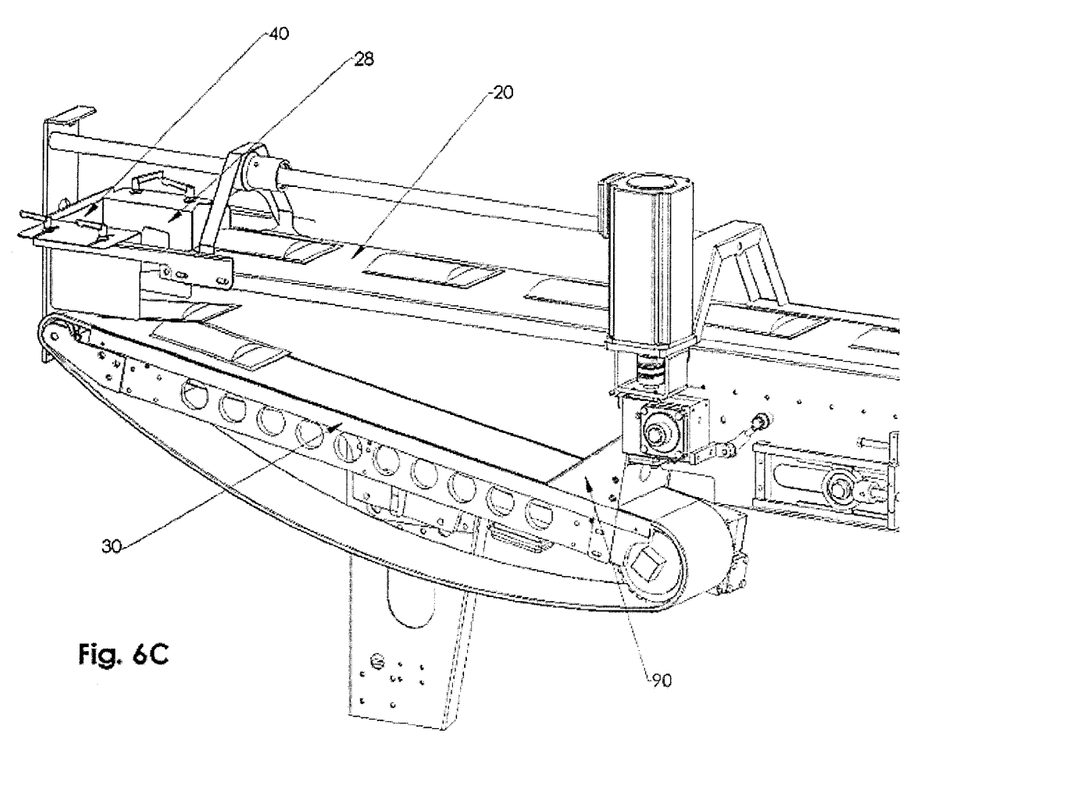
Figure 6D:
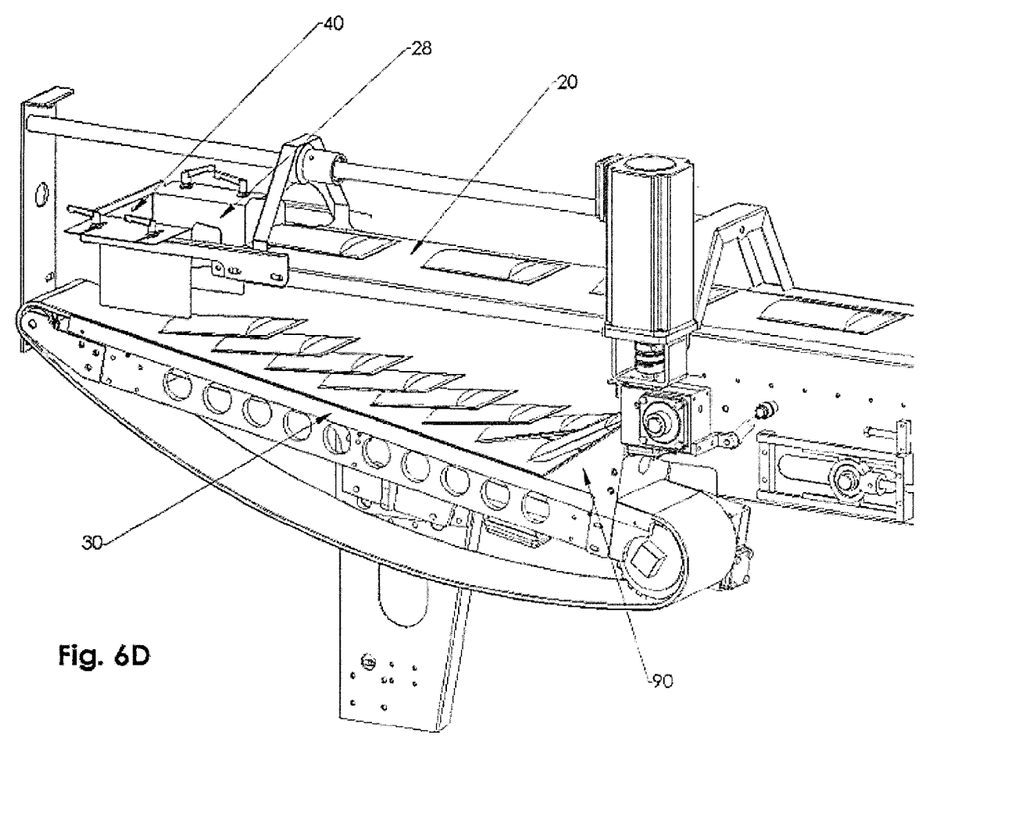
Figure 6E:
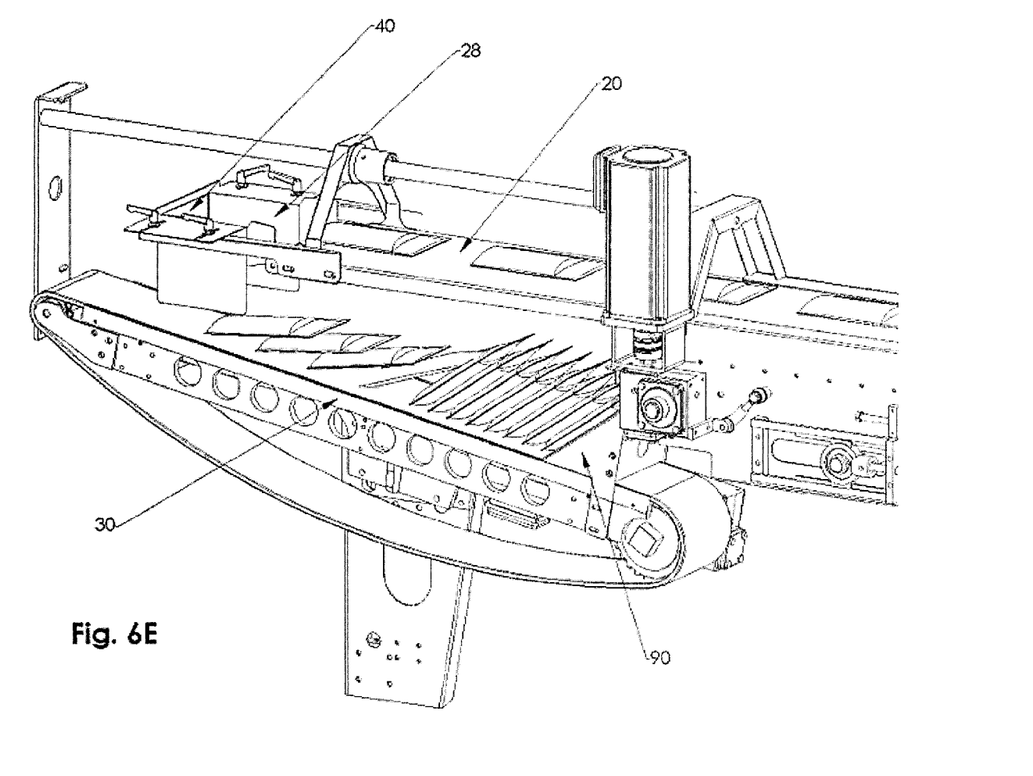

The apparatus is coordinated by an appropriate control mechanism (such as an Allen-Bradley PLC) in such a manner that the Upper Conveyor 20 smoothly and continuously retracts its nose in the direction of movement of the Lower Conveyor 30. The Lower Conveyor 30 moves a distance based upon the position of the nose and the preceding bag so that each product slightly overlaps the preceding product on the Lower Conveyor 30. FIGS. 6A–6E show this process. It will be seen that the products generally lie relatively flat on the Lower Conveyor 30 until they reach the Shingling Plate 90, which causes the product to be tilted upwardly, beginning in FIG. 6E. The following products also tilt upwardly, as shown in FIG. 6E.

Meanwhile, additional product has been accumulating on the Upper Conveyor 20. When the Upper Conveyor 20 completes its task of depositing product from the first product group on the Lower Conveyor 30, the Upper Conveyor 20 extends its nose 28 in its direction of movement to create a gap between the first product group (now on the Lower Conveyor) and the next product group. This gap provides a time interval for the Cross Pusher to move product off the Lower Conveyor 30, as will next be described, before the next product group is deposited on the Lower Conveyor.

Figure 1:
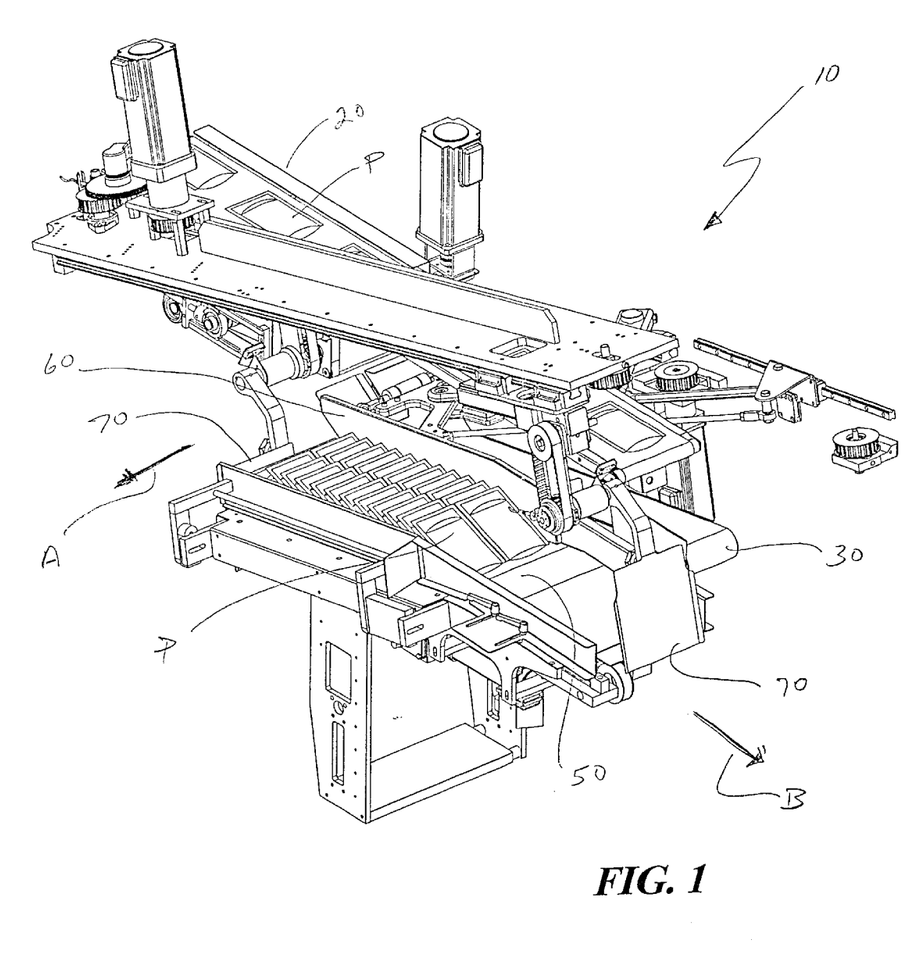
FIG. 1 is a right side perspective view of the apparatus of the present invention.
Figure 2:
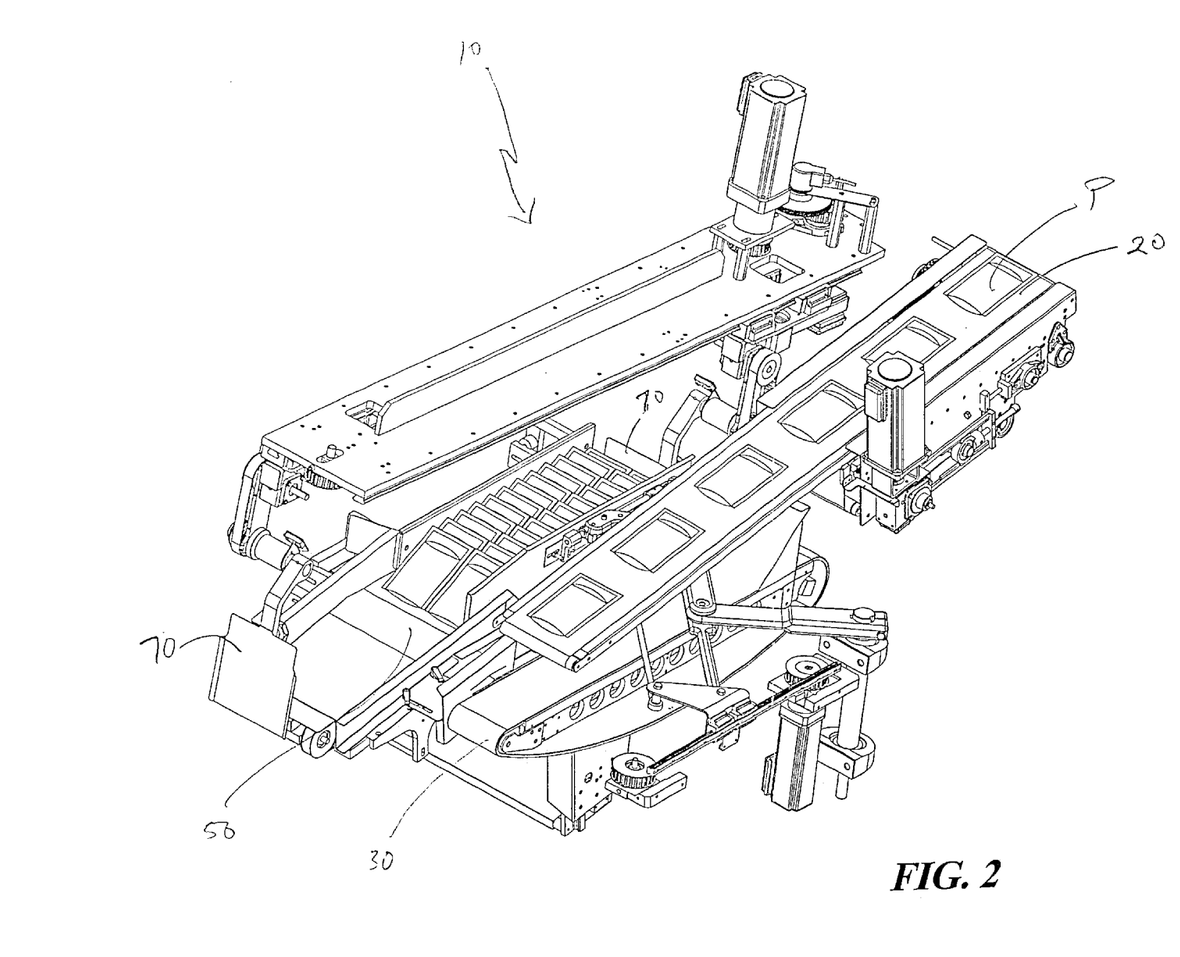
FIG. 2 is a left side perspective view of the apparatus of the present invention.

When an appropriate number of products have reached the Shingling Plate 90, the Cross Pusher 60 will be activated to move the accumulated product from the Lower Conveyor 30 to the Loader Deck 50, by moving in the direction of arrow A, FIG. 1.

The Upper Conveyor's nose 28 is then retracted against the conveyor's direction of movement and begins depositing product from the next product group on the Lower Conveyor 30, as already described. This may happen slightly before the Cross Pusher moves the first product group off the Lower Conveyor 30 (FIG. 6E), providing overlap of operations and increasing performance.

The Cross Pusher 60 will remain extended out of the way of the Lower Conveyor until the moment before the next group of product is ready to be pushed from the Lower Conveyor 30 to the Loader Deck 50. At that moment, the Cross Pusher 60 will pivot upwardly, clearing product on the Lower Conveyor 30 and returning. Immediately upon reaching its starting position, the Cross Pusher 60 is pivoted down, encounters the next product group on the Lower Conveyor 30, and pushes this product group onto the Loader Deck 50.

When an appropriate number of rows of product have accumulated on the Loader Deck 50, the Loader Plate 70 moves the product in the direction of arrow B, FIG. 1, off the Loader Deck 50 to the discharge station 80. At the discharge station 80, the product is placed in shipping containers, top up, by standard mechanisms.

It will be understood from the above description that the movements of the Upper Conveyor 20, Lower Conveyor 30, and Cross Pusher 60 are coordinated to overlap to the maximum extent possible to increase machine throughput. These movements are suitably coordinated by a control mechanism such as an Allen-Bradley PLC.

Figure 3:
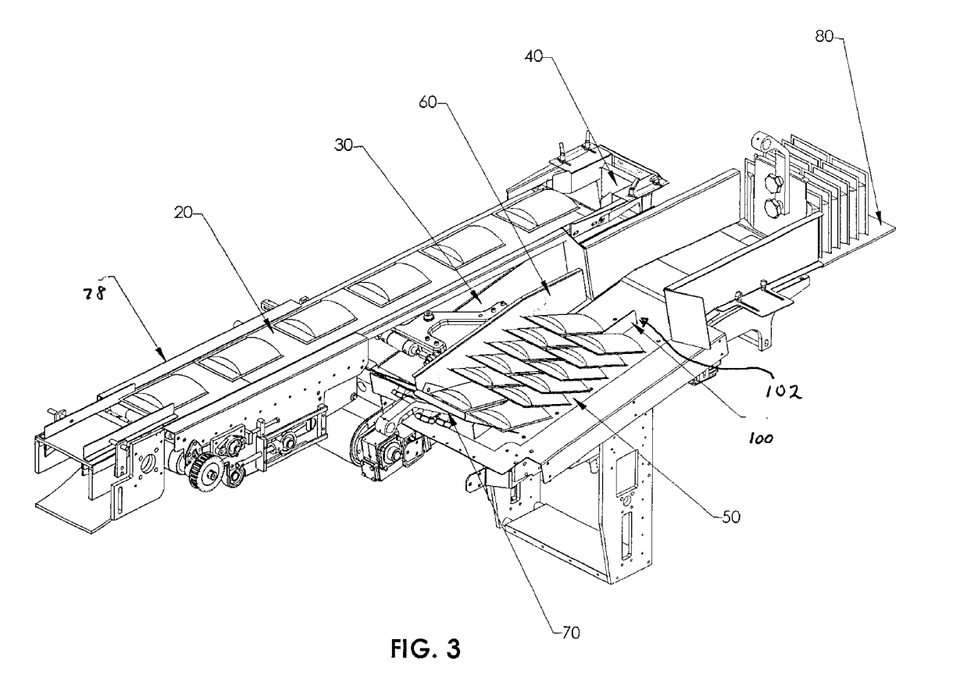
FIG. 3 is a schematic of the present invention, showing various components.

Preferably, the apparatus 10 further comprises a divider plate slot 102 in the Loader Deck 50, through which a separator 100 may be inserted so as to lie between the rows of product, as seen in FIG. 3.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Apparatus for collating products into arrays, comprising:
   (a) an upper conveyor receiving the products at random intervals, the upper conveyor moving in a first direction, the upper conveyor establishing a first gap thereon between each product and a second gap thereon to create groups of products, the upper conveyor having a nose;
   (b) a lower conveyor positioned below the upper conveyor and receiving the products from the upper conveyor, the lower conveyor moving in a second direction substantially opposed to the first direction; and
   (c) a reverse shingling plate associated with the upper conveyor at the nose thereof and blocking product movement beyond the nose, whereby product encountering the reverse shingling plate drops onto the lower conveyor.

2. The apparatus of claim 1, further comprising a loader deck adjacent the lower conveyor and a cross pusher moving product from the lower conveyor to the loader deck.

3. The apparatus of claim 2, further comprising a loader plate moving product between the loader deck and a discharge station.

4. The apparatus of claim 1, wherein the upper conveyor creates the first gap by adjusting the products' speed relative to the rate at which product arrives on the upper conveyor.

5. The apparatus of claim 4, wherein the upper conveyor creates the second gap by changing its length.

6. The apparatus of claim 5, wherein the upper conveyor further comprises a tabletop belt on which product is received, a linear rail attached to the tabletop belt, a tabletop belt pulley attached to the linear rail, an attachment plate connected to the linear rail, a drive, a length adjustment belt connected to the drive and to the attachment plate, and a tabletop belt drive pulley over which the tabletop belt passes and by which it is driven, wherein activation of the drive causes the length adjustment belt to move the attachment plate toward or away from the nose, thereby retracting or extending the nose.

7. The apparatus of claim 5, wherein the nose retracts in the second direction to deposit product successively upon the lower conveyor, each product partially overlapping a preceding product.

8. The apparatus of claim 7, further comprising a shingling plate associated with the lower conveyor, the shingling plate angled upwardly and in the second direction, wherein product encountering the shingling plate becomes angled upwardly in the second direction.

9. The apparatus of claim 7, further comprising a programmed controller coordinating the movements of the upper conveyor, lower conveyor, and cross pusher to increase product throughput.

10. The apparatus of claim 2, further comprising a separator slot in the Loader Deck, the separator slot receiving a product separator therethrough for separating products into rows.

11. A method for collating products into arrays, comprising the steps of:
   (a) receiving product onto an upper conveyor at random intervals, the upper conveyor having a nose;
   (b) establishing a first gap between each product on the upper conveyor;
   (c) establishing a second gap between products on the upper conveyor to create product groups;
   (d) transferring each product from the nose to a lower conveyor under the influence of gravity, the lower conveyor running in a direction opposite to that of the upper conveyor;
   (e) moving the nose along the lower conveyor in the direction of movement of the lower conveyor;
   (f) repeating steps (d) and (e) for each product in a product group;
   (g) orienting the product group angled upwardly and in the direction of movement of the lower conveyor;
   (h) transferring the product group to a loader deck;
   (i) moving the nose along the lower conveyor against the direction of movement of the lower conveyor; and
   (j) repeating steps (d) through (i).

12. The method of claim 11, wherein step (b) is performed by setting the speed of the upper conveyor to a rate greater than that at which product arrives on the upper conveyor.

13. The method of claim 12, wherein step (c) is performed by varying the length of the upper conveyor.

* * * * *